US006888626B2

(12) United States Patent
Levecq et al.

(10) Patent No.: US 6,888,626 B2
(45) Date of Patent: May 3, 2005

(54) DEVICE FOR AUTOMATICALLY DETECTING CHARACTERISTICS OF AN OPHTHALMIC LENS AND AN AUTOMATIC DEVICE FOR FITTING A CENTERING AND DRIVE PEG INCORPORATING IT

(75) Inventors: Xavier Levecq, Gif sur Yvette (FR); Fabien Divo, Gonesse (FR); Laurent Guillermin, Paris (FR)

(73) Assignee: Essilor International (Compagnie General d'Optique), Charenton Le Pont (FR)

( * ) Notice: Subject to any disclaimer, the term of this patent is extended or adjusted under 35 U.S.C. 154(b) by 130 days.

(21) Appl. No.: 10/161,679

(22) Filed: Jun. 5, 2002

(65) Prior Publication Data

US 2003/0015649 A1 Jan. 23, 2003

(30) Foreign Application Priority Data

Jun. 5, 2001 (FR) .............................. 01 07311

(51) Int. Cl.[7] ................................ G01B 9/00
(52) U.S. Cl. .................................... 356/124
(58) Field of Search ................ 356/124–127; 351/200, 204, 246, 221, 169, 171, 177

(56) References Cited

U.S. PATENT DOCUMENTS

| 4,180,325 | A | | 12/1979 | Humphrey |
| 4,601,575 | A | * | 7/1986 | Tamaki ....................... 356/124 |
| 5,331,394 | A | * | 7/1994 | Shalon et al. ............... 356/124 |
| 5,754,272 | A | * | 5/1998 | Dimalanta ................... 351/204 |
| 5,855,074 | A | * | 1/1999 | Abitbol et al. ................ 33/507 |
| 6,088,379 | A | | 7/2000 | Owa et al. |
| 6,496,253 | B1 | * | 12/2002 | Vokhmin ..................... 356/124 |

FOREIGN PATENT DOCUMENTS

| EP | 1 093 907 A2 | 4/2001 |
| IR | 2 481 452 | 4/1981 |
| JP | 08033993 | 6/1996 |

* cited by examiner

*Primary Examiner*—Michael P. Stafira
(74) *Attorney, Agent, or Firm*—Young & Thompson

(57) ABSTRACT

A device for automatically detecting characteristics of an ophthalmic lens includes a support receiving the lens, an illumination system and an analysis system. The optics of the illumination system define two alternate optical paths, one of which passes through a mask forming a Hartmann matrix.

20 Claims, 2 Drawing Sheets

DEVICE FOR AUTOMATICALLY DETECTING CHARACTERISTICS OF AN OPHTHALMIC LENS AND AN AUTOMATIC DEVICE FOR FITTING A CENTERING AND DRIVE PEG INCORPORATING IT

BACKGROUND OF THE INVENTION

1. Field of the Invention

The invention relates to a device for automatically detecting various characteristics of an ophthalmic lens, in particular for recognizing the type of lens (constant power or progressive power, for example monofocal, multifocal or progressive lenses), measuring its power, its astigmatism, its prism, and possibly its power in different areas, and then identifying the note-worthy characteristics of the ophthalmic lens concerned, such as, for example, the positions of the optical center and the axis of the cylinder, in the case of a non-progressive lens, or the position of a characteristic point called the "prism reference point" or the axis called the "horizontal axis", in the case of a progressive lens.

The invention also applies to fitting a centering and drive peg which is glued to the ophthalmic lens for positioning the lens correctly in a grinding machine for imparting to it the required contour, adapted to the shape of the chosen frame.

The invention finds a particularly advantageous application when the device is associated with a lens trimming machine designed to take up a lens after identification of its main characteristics and move it automatically to a grinding station where its contour is modified to adapt it to a chosen frame shape, taking also into account data specific to the user, such as the interpupillary distance and the height, as measured on the wearer.

2. Description of the Prior Art

Trimming an ophthalmic lens, typically by grinding it, necessitates a knowledge of several characteristics specific to the lens. For example, to correct astigmatism effectively using a non-progressive lens, it is necessary to know the position of the optical center and the axis of the cylinder. Indeed, in the case of a non-progressive ophthalmic lens, the optical center must correspond, once the lens is fitted to the frame, to the position of the pupil of the eye. Any offset leads to a prism effect that increases as the power of the ophthalmic lens increases. To correct astigmatism effectively, the axis of the cylinder must also correspond to the axis of the prescribed cylinder. In the case of non-progressive lenses, a device called a lensometer is used to determine these two characteristics manually. The operator moves the lens to locate the optical center and the axis of the cylinder at the same time, and a mechanical device marks the ophthalmic lens at three points that constitute reference points for positioning the lens. The three reference points are then used to center the lens manually on a centering device. The lens is then fitted with a centering and drive peg for locating it in the trimming machine.

In the case of a progressive lens, it is necessary to identify other characteristics, such as the position of a point called the prism reference point (PRP) or an axis called the horizontal axis. A knowledge of these latter characteristics is indispensable for proper correction of the vision of the wearer.

The centering point of the progressive lens, which is the point at which the pupil must be centered, is at a known distance from the PRP, and is therefore known if the PRP is known. Moreover, the horizontal axis gives the orientation with which the lens must be mounted on the frame for proper correction. Progressive lenses always include two relief or diffusing etched markings. These are difficult to see, so lenses often have printed marks that are erased after fitting. These etched or printed markings are used to center the lens, as the lensometer cannot be used to center this type of lens. The segment defined by the two etched markings defines the horizontal axis and the middle of the segment defines the PRP. If the lens is marked, the horizontal axis and the PRP are defined by the marks. A spot defines the PRP and two lines define the horizontal axis. If the lens is not marked, the operator applies marks on top of the etched markings, to make them more visible.

Finally, other types of ophthalmic lens necessitate specific centering operations. In the particular case of lenses known as double-focus lenses, centering is effected using the segment of the lens.

All these centering operations generally terminate in the manual fitting to the lens of a centering and drive peg by means of which the lens is subsequently located correctly in the trimming machine.

To summarize, to be able to center all types of ophthalmic lens known to the person skilled in the art, it is generally necessary to use two devices (a centering device and a lensometer). These operations are usually carried out manually and lead to the fitting of a peg, which operation is also usually carried out manually and constitutes a source of inaccuracies.

SUMMARY OF THE INVENTION

The invention provides a single device for determining the characteristics of an ophthalmic lens automatically, as well as its power, at one or more points on its surface. The device advantageously also recognizes the type of lens (monofocal, multifocal, progressive, right-hand or left-hand). The operator can therefore be informed that the wrong lens has been chosen (a lens not corresponding to the prescription) before trimming it. The optical characteristics are recognized automatically and without having to move the lens.

To be more precise, the invention provides a device for automatically detecting characteristics of an ophthalmic lens, including a support shaped to receive a lens and, on respective opposite sides of the support, on the one hand, an illumination system including an optical system for producing a light beam directed toward a lens on the support and, on the other hand, a system for analyzing the image transmitted by the lens on the support, wherein the optical system defines two alternate optical paths for the light beam and a mask forming a Hartmann matrix or the like is placed on one only of the paths at a location such that it occupies a predetermined position relative to an optical axis of the analysis system.

The device is also noteworthy in that the two optical paths have a common part on the upstream side of the support so that the lens is illuminated either by a complete parallel beam over the whole of its surface or by a beam of parallel individual light rays produced by the mask defining the Hartmann matrix. A Hartmann matrix is a screen pierced with holes in a predetermined geometrical configuration, or a grid, or like means.

The illumination system includes at least two alternate light sources respectively corresponding to the two optical paths. A first of the two light sources is a point source associated with a collimator lens adapted to generate a complete parallel beam illuminating the mask. Also, a second of the two light sources is adapted to illuminate the lens on the support via a portion of the optical system excluding the mask. For example, the second light source can be associated with a semireflecting mirror inserted between the mask and the support and materializing the intersection of the two optical paths. The common portion upstream of the support is between the mirror and the support. The mirror is between the mask and the support. The second light source is a point source associated with a collimator lens adapted to generate a complete parallel beam directed toward the mirror, which directs the beam back toward the support with the ophthalmic lens on it. If the two parallel beams generated by the first and second light sources are mutually perpendicular, the mirror is typically at an angle of 45° to the optical axis of the beam from the first light source, which is also the optical axis of the analysis system.

The second light source is adapted to show up printed markings or etched markings in relief. In mineral lenses, however, the etched markings diffuse light. In this case, the second light source is replaced by a third light source at the periphery of the support to illuminate a lens on the support at grazing incidence.

The aforementioned analysis system includes a frosted translucent screen perpendicular to the optical axis between the support and an optical receiver. The latter can be a matrix sensor associated with a suitable group of lenses, of the telecentric type, or a video camera whose lens takes the place of the group of lenses.

The invention will be better understood in the light of the following description of a device for automatically detecting characteristics of an ophthalmic lens, which description is given by way of example only and with reference to the accompanying drawings.

DETAILED DESCRIPTION OF THE PREFERRED EMBODIMENT

Figure 1:
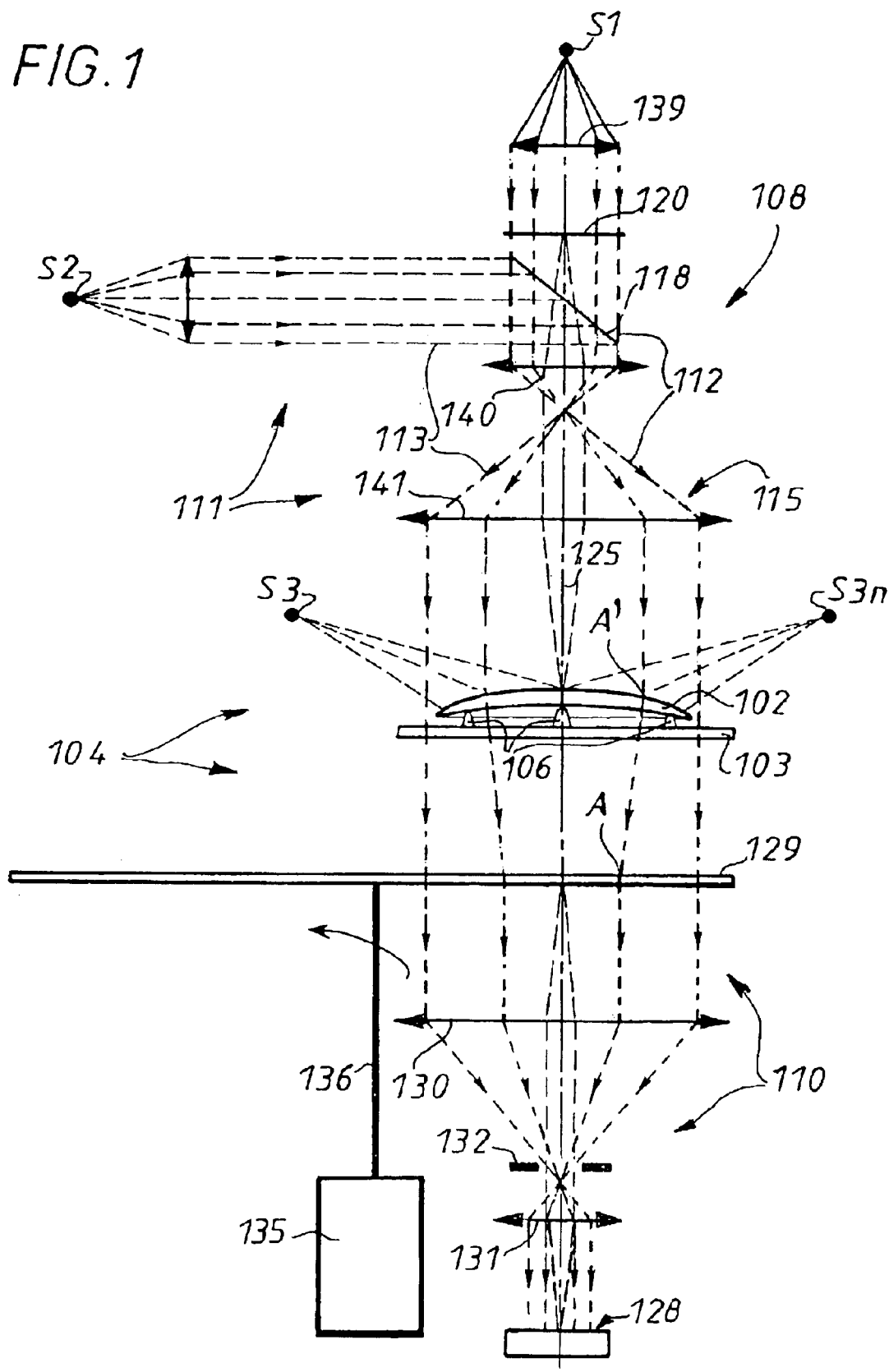
FIG. 1 is a theoretical diagram of a device in accordance with the invention.

The device 104 for automatically detecting characteristics of an ophthalmic lens 102 includes a horizontal support 103 comprising a transparent glass plate with projections 106 forming a tripod for supporting the lens and, on either side of the support: on the one hand, an illumination system 108 including optics for producing a light beam directed toward a lens on the support and, on the other hand, a system 110 for analyzing the image transmitted by the lens on the support.

The optical system 111 is adapted to define two alternate optical paths 112, 113 for the light beam. In the example shown, the illumination system includes at least two alternate light sources S1, S2, respectively corresponding to the two optical paths previously cited. In other words, when the source S1 is on, the source S2 is off, and vice-versa. The two optical paths 112, 113 have a common portion 115 on the upstream side of the support, to be more specific between a semi-reflecting mirror 118 and the support 103. The mirror materializes the intersection of the two optical paths. It can be replaced by a splitter cube or a removable mirror.

According to one important feature of the invention, a mask 120 forming a Hartmann matrix or the like is placed on one only of the paths (the path 112 in this example), at a location such that it occupies a predetermined position relative to an optical axis 125 of the analysis system 110. The optical axis 125 is in fact the common axis of certain lenses of the optical system that are centered relative to the source Si and of an optical receiver 128 forming part of the analysis system 110 on the other side of the support 103. The analysis system also includes a frosted translucent screen 129 perpendicular to the optical axis 125 between the support 103 and the optical receiver 128. The latter can be a matrix sensor or a video camera. If the optical receiver is a matrix sensor, a system is added to it comprising two lenses 130, 131 and a diaphragm 132 (this system is referred to hereinafter as the telecentric system). If the optical receiver is a video camera, these components are replaced by the camera lens. The frosted translucent screen 129 is a disc adapted to be driven in rotation by a motor 135 about an axis 136 parallel to the optical axis 125 and spaced therefrom, and is preferably a lens or the like with a frosted surface.

Returning to the optical system 111 associated with the sources S1 and S2, the first of these two sources (the light source S1) is a point source associated with a collimator lens 139 adapted to generate a complete parallel beam illuminating the mask 120. The source S1 is used to establish a kind of map of the lens (measured power/astigmatism at several points of the lens), to determine the optical center of non-progressive lenses, and to reposition the objects (etched markings, printed markings, segments) on the front face of the lens seen with S2. S1 can be mobile along the optical axis or an axis perpendicular thereto. The collimator lens 139 is centered on the optical axis previously cited. The optical system further includes an expander comprising two lenses 140, 141 also centered on the optical axis previously cited and placed between the mirror and the support. This expander generates a larger parallel light beam, which is larger than the ophthalmic lens, and images the mask 120 on the surface of the lens.

A second light source S2 is adapted to illuminate the lens 102 on the support 103 via a portion of the optical system excluding the mask 120 forming the Hartmann matrix. This second light source is associated with the semi-reflecting mirror 118, which materializes the intersection of the two optical paths 111, 112. This source S2 is a point source associated with a collimator lens adapted to generate a complete parallel beam directed toward the mirror 118. The beam generated by S2 is perpendicular to the beam generated by S1 and the mirror is at an angle of 45° to the optical axis 125 so that the complete parallel beam from S2 is reflected at this mirror and directed toward the support 103 of the ophthalmic lens. On the other hand, on the downstream side of the mask 120, the light emitted by the source S2 is divided into parallel separate light rays at the exit of the expander 140, 141.

As explained later, the source S2 is mainly used to determine printed markings, etched markings in relief, and segments (bifocal and trifocal lenses). On the other hand, a mineral ophthalmic lens includes diffusing etched markings. In this case, for some operations it is necessary to illuminate the lens 102 at a grazing incidence. For this reason the device includes a third light source, in this example a plurality of sources S31, S3n distributed circumferentially at the periphery of the support 103, to illuminate a lens on the support at a grazing incidence. In this case, the light rays must not be diffused by the frosting, and it is therefore necessary to provide either a retractable frosted lens or a lens having a polished area and used only in this situation.

The light sources S1, S2 mentioned above can be light-emitting diodes (LED) or laser diodes, preferably associated with respective optical fibers. The sources S31, S3$n$ are preferably light-emitting diodes.

How the device can be used to determine characteristics of the ophthalmic lens on the support is described next.

1—Identifying the Ophthalmic Lens

It is useful to be able to recognize, before anything else, the type of ophthalmic lens (monofocal, multifocal or progressive) that is being analyzed, in order to avoid errors. To this end, the source S1 is used in conjunction with the mask forming a Hartmann matrix. The complete parallel beam is converted by the mask 120 into a plurality of thin individual beams corresponding to the configuration of the mask. Each of these rays impinges on the entry face (front face) of the lens in a direction parallel to the optical axis. These rays are deflected by the lens and can be seen as light spots on the rotating frosted screen 129. The frosting is imaged on the matrix sensor associated with the telecentric device or that of the video camera, and the spots are analyzed by an electronic data processing system 16 (FIG. 2) which determines their displacement.

In the case of a monofocal lens, the displacement of the spots of the mask (i.e. of the light spots that can be seen on the frosted screen) after deflection by the lens is in linear progression from the center toward the periphery, compared to the positions of the same points when there is no ophthalmic lens on the support. The positions of the points of the Hartmann mask on the screen when there is no lens on the support are measured during a calibration phase. Consequently, measuring a displacement of this kind determines the type of lens. For example, in the case of a convergent lens, the spots move toward the optical axis, by an amount increasing with the power of the lens.

2—Determining the Progression Line of a Progressive Lens

Under the measuring conditions indicated hereinabove, it is seen that, in the case of a progressive lens, the displacement of the spots varies along a line called the "progression line". To determine this progression line, the direction of the power gradient is determined by calculating the power at different points of the lens, for example using the method indicated below. This direction is the progression line. It is therefore possible to measure this and calculate from it the orientation of the progression line, which is one important characteristic of a progressive lens. Note that these calculations are carried out on two series of data: on the one hand, the configuration of the light spots produced by the Hartmann mask on the frosted screen when there is no ophthalmic lens on the support and, on the other hand, the corresponding configuration of the same spots when it results from deflection of all of the rays by the ophthalmic lens.

3—Determining the Optical Center of a Non-progressive Lens

If the ophthalmic lens 102 has been identified as a monofocal lens, it is a simple matter to determine the position of the optical center of the lens by comparing the light spots generated by the reference mask (which appear on the frosted screen 129 when there is no lens on the support) and the corresponding spots that can be seen on the frosted screen after deflection by the lens. In principle, the light spot that has not been deflected corresponds to the position of the optical center. As there is generally no ray that has not been deflected, in fact this process relies on interpolation between the least deflected rays, for example using the least squares method.

4—Calculating the Power and the Astigmatism of the Lens

In the case of a monofocal lens, the distance between the focus and the rear face of the lens represents the power.

The position of the rear face of the lens is given to a good approximation by the position of the support, since the lens is placed on it. The image on the frosted screen of the mask forming the Hartmann matrix is used to determine the focus. To this end, the position of the corresponding light spots is compared between the calibration image (without the lens) and the image obtained with the lens. The position and direction of the light rays are compared for several adjacent points, to calculate the position of the focus on the optical axis (and thus the power, which is the reciprocal of the distance from the focus to the lens) and the astigmatism of the lens, if any (astigmatism axis and value). These measurements are local and can be repeated over different areas of the lens, to produce a map of the power of the lens.

5—Determining the Prism Reference Point and the Horizontal Axis of a Progressive Lens At any point on an ophthalmic lens, the front face and the rear face can be considered to be at an angle, similar to a the surfaces of a prism. Moreover, the addition of a progressive lens is defined as the difference between the maximum power and the minimum power of the lens. By convention, the prism reference point (PRP) is defined as the point at which the prism of the lens is equal to two thirds of the addition.

The prism reference point on a progressive lens is the center of a segment separating two etched marks on the lens. This point is usually also marked by a specific printed mark. The PRP is identified by illuminating the lens with the light source S2, i.e. without using the Hartmann mask 120. The image transmitted by the ophthalmic lens appears on the frosted lens 129, and is perceived by the optical receiver 128. The reading is accompanied by appropriate image processing to discern more clearly the etched or printed markings. This visualization of the etched or printed markings and the determination of the PRP are then used to determine the centering point of the progressive lens, which is analogous to the optical center, and with which the position of the center of the pupil of the eye of the wearer must coincide, and the horizontal axis that defines the orientation of the lens in the frame.

6—Determining the Shape and Dimensions of the Lens

These characteristics are determined by illuminating the ophthalmic lens with the source S2 and carrying out appropriate image processing to discern the contours of the lens more clearly. Before trimming, the lens is generally circular, and the main object of this analysis is to determine its diameter. However, the lens may already have a shape close to that of the frame for which it is intended Image processing determines the shape and dimensions of the non-circular lens, to verify that it is sufficiently large to fit into the frame.

7—Determining the Position of the Segment of a Double Focus Lens

The source S2 is used to view the ophthalmic lens on the frosted screen. Appropriate image processing shows the luminous intensity variations more clearly on the screen, so that a sharp contour of the limits of the segment can be obtained and its position accurately determined.

Note that, for all the parameters indicated hereinabove that are acquired by illuminating the ophthalmic lens with the source S2, that is to say excluding the Hartmann mask, it is possible to process the measurements to "transfer" the positions of the printed or etched markings or the segment as read on the frosted screen to the front face of the ophthalmic lens. The source S2 is used to view the printed or etched markings or the segment but does not determine their positions on the front face of the lens. On the other hand, the source S1 is used to calculate their precise position on the front face of the lens, once they have been acquired using the source S2. The procedure is as follows. Consider a light spot A on the frosted screen 129, corresponding to one of the holes in the Hartmann mask. The corresponding light ray impinges on the front face of the lens 102 at A'. Initially, the source S2 is on, and the corresponding image that appears on the frosted screen is stored in memory. The source Si is then turned on and the source S2 turned off. The image of the Hartmann mask therefore appears on the frosted screen 129. By construction, the height of each hole in the Hartmann mask (i.e. the distance of the hole from the optical axis 125) is known Consequently, for a given radius, and given that the characteristics of the expander 140, 141 are known, the height of the ray corresponding to its point of entry on the front face of the ophthalmic lens 102 is known. In other words, the height of the point A' corresponding to the point A is known. Consequently, a correction can be applied to the point A to determine the point A'. It is therefore possible to find the position on the lens itself of any mark that can be read on the frosted screen, which increases the accuracy of the measurement. In other words, using a Hartmann mask in conjunction with the light source S1 (with the Hartmann mask placed on the upstream side of the ophthalmic lens) improves all the measurements that are effected by illuminating the lens from a source S2 along an optical path excluding the mask.

As previously mentioned, if the ophthalmic lens is a mineral lens, the measurements normally carried out using the source S2 can be carried out under improved conditions by substituting for the source S2 one or more sources illuminating the front face of the lens at grazing incidence.

Figure 2:
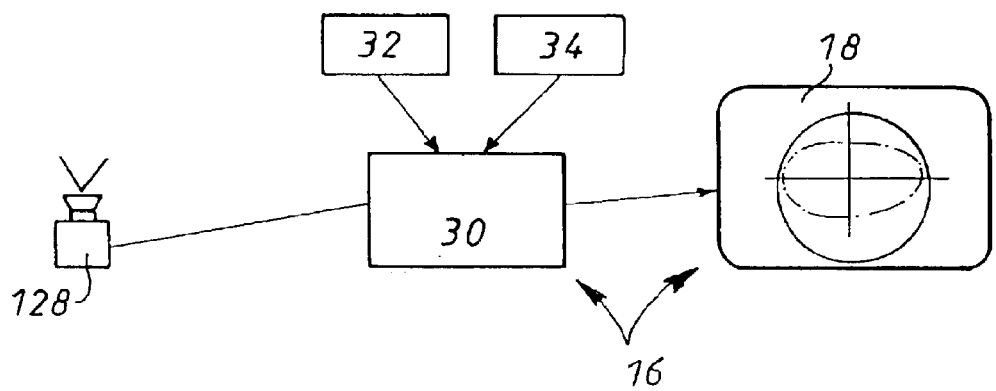
FIG. 2 is a diagram showing how the point at which the lens is to be held is determined.
Figure 3:
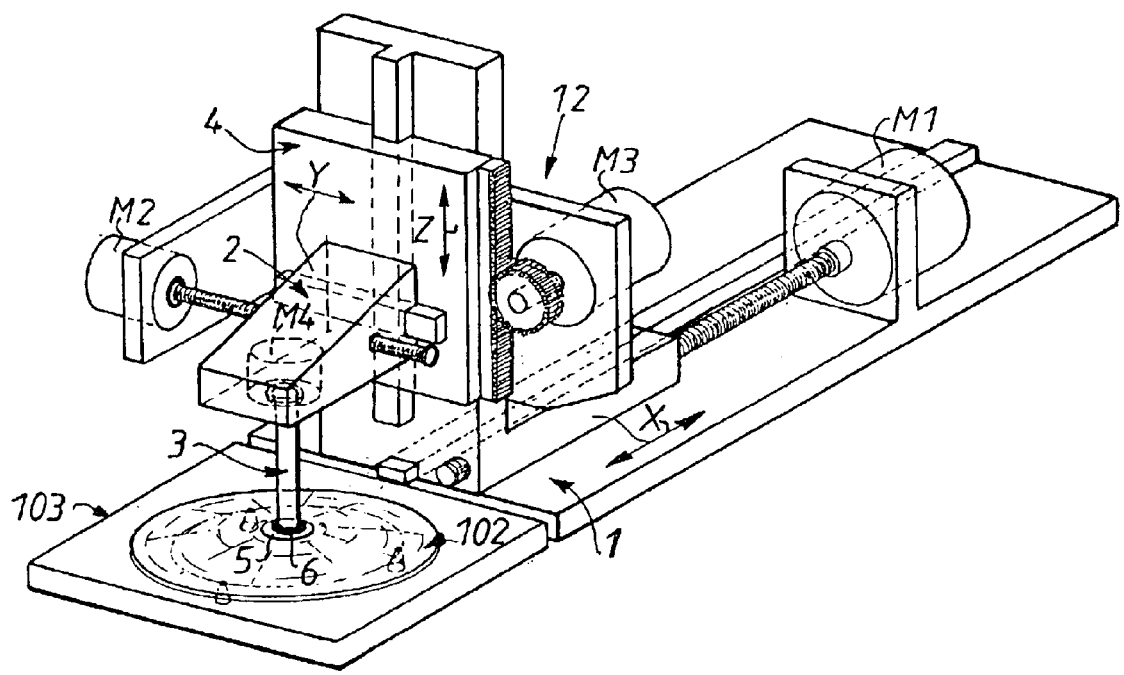
FIG. 3 is a theoretical diagram of a device for automatically fitting a centering and drive peg to the lens.

By way of an application of the invention, there is described next with reference to FIGS. 2 and 3 a device for automatically applying a centering and drive peg to the ophthalmic lens, the peg defining a machining frame of reference necessary for trimming the edges of the lens to impart to it a shape corresponding to the chosen frame.

The optical sensor or the video camera 128 analyzes the image of the lens that is formed on the frosted screen 129. The information produced by the matrix sensor or the video camera is sent to a calculation and visualization system 16. The information is processed by an electronic data processing system 30 which also receives information representative of parameters specific to the morphology of the wearer, in particular the interpupillary distance and the height of the pupil relative to the horizontal axis. The optician measures these parameters on the wearer and enters them into the system via a transmitter 32. Information representative of the contour of the chosen frame, which is stored in a memory 34, for example, and selected by the optician, is also transmitted to the electronic data processing system 30. The electronic data processing system 30 produces a video image that is displayed on the screen 18 of a television monitor. Consequently, the contour of the frame and that of the untrimmed lens, with its particular characteristics, in particular the marker points it carries or that have been determined by using the device shown in FIG. 1 are seen on the screen, to the same scale. All these measured, calculated and read parameters are taken into account to determine the position of the perimeter of the trimmed lens relative to the original ophthalmic lens and, accordingly, the position of the point at which the lens is to be held for trimming, which is generally the center of the rectangle in which is inscribed the contour of a rim or "ring" of the frame.

Consequently, the invention also relates to a device for automatically fitting a centering and drive peg to an ophthalmic lens, characterized in that it includes a detector device as previously described. The device is therefore characterized in that it includes a controlled positioning mechanism 12 including a positioning arm 2 for positioning a centering peg 6 and adapted to engage in a space left free above the support 103, to be more specific between the ophthalmic lens 102 and the lens 141. This mechanism is used to fix to the lens the centering and drive peg 6 that will act as a reference when the lens is installed in the trimming machine. This peg must be placed at a precise point on the lens, which corresponds to the center of the rectangle in which is inscribed the contour of the rim or "ring" of the chosen frame. Because the lens is to be mounted with a predetermined orientation, the peg determines simultaneously the position of this point and the orientation of the lens to be trimmed relative to the grinding device.

The position and the orientation of the centering peg 6 on the lens are determined from the known optical center or centering point (in the case of progressive lenses), the astigmatism axis or the horizontal axis (in the case of progressive lenses), and parameters representative of the morphology of the wearer (interpupillary distance, height of the pupil relative to the frame, astigmatism axis of the wearer). The optical center or centering point, the astigmatism axis and the horizontal axis are known as a result of using the measuring device described with reference to FIG. 1. The parameters representative of the wearer are entered via the device described with reference to FIG. 2.

Knowing all the above parameters, the positioning mechanism positions the peg correctly on the lens. Consequently, the mechanism has three degrees of freedom, two translation axes X and Y (FIG. 3) for positioning the peg relative to the centering point, and a rotation axis (shaft 3) to conform to the correct orientation of the peg relative to the lens.

When the peg 6 has been positioned and oriented correctly, it is placed on the ophthalmic lens 102 by moving it along a supplementary translation axis Z. The peg can include a pad 5 of adhesive material. The axes X, Y and Z are orthogonal.

The device operates as follows:

The operator places a centering peg 6 on the shaft 3 carried by the arm 2 for positioning the peg. The pad 5 of adhesive material is placed on the peg so that the latter adheres to the lens when the pad is moved into contact with the lens. The characteristics of the ophthalmic lens 102 are determined as indicated above, in order to determine the lens characteristics necessary for centering it.

The centering peg has a reference indicator so that it can be positioned on the shaft 3 with a known orientation. The arm 2 for positioning the peg is fastened to a mobile frame comprising a base 1 movable in a direction X by a motor M1 and an intermediate block 4 movable in a direction Z by a motor M3. The block 4 moves along a vertical portion of the base 1. The positioning arm 2 is moved along the block 4 in a direction Y by a motor M2. As previously indicated, the shaft 3 carried by the positioning arm 2 is driven in rotation by a motor M4 carried by the arm 2 in order to be able to orient the peg 6 correctly relative to the ophthalmic lens 102.

During the operations of analyzing the lens 102, the positioning device is disengaged; in other words, the support 1 moving along the axis X is withdrawn as far as possible to avoid the positioning arm 2 interfering with the measuring device.

How to place the peg on the lens is known once the lens has been analyzed and the data representative of the wearer has been taken into account. The plate 1 then moves toward the lens along the axis X and stops when the centering peg is at the correct position along the axis X. The positioning arm 2 is then moved along the axis Y by motor M2, in accordance with the same principle, to position the peg correctly. The shaft 3 rotates to orient the peg correctly relative to the lens. Finally, the block 4 is moved along the axis Z by the motor M3, for example by means of a rack and pinion. This movement in translation positions the peg on the lens.

When the positioning arm 2 is raised in the direction of the axis Z by the motor M3, by means of a rack and pinion, the peg is placed at the correct location on the lens. The support 4 is then raised, but the peg 6 remains attached to the lens thanks to its adhesive pad 5. All that remains is for the user to remove the lens from the support 103 and place it in the grinding device.

After disengaging the positioning mechanism, the system returns to the disengaged position, away from the optical path of the automatic detector device.

What is claimed is:

1. A device for automatically detecting characteristics of an ophthalmic lens, comprising:
    a support shaped to receive a lens and,
    on respective opposite sides of said support,
    i) an illumination system including an optical system for producing a light beam directed toward a lens on said support and, ii) a system for analyzing the image transmitted by said lens on said support,
    wherein, said optical system defines two alternate optical paths for said light beam, and
    a mask is placed on one only of said paths at a location such that it occupies a predetermined position relative to an optical axis of said analysis system and the other path is exempt from any mask.

2. The device claimed in claim 1 wherein said two optical paths have a common part on the upstream side of said support.

3. The device claimed in claim 1 wherein said illumination system includes at least two alternate light sources respectively corresponding to said two optical paths.

4. The device claimed in claim 3 wherein a first of said two light sources is a point source associated with a lens adapted to generate a parallel beam illuminating said mask.

5. The device claimed in claim 3 wherein a second of said two light sources is adapted to illuminate said lens on said support via a portion of said optical system excluding said mask.

6. The device claimed in claim 2 wherein said second light source is associated with a semireflecting mirror inserted between said mask and said support and materializing the intersection of said two optical paths.

7. The device claimed in claim 6, wherein said second source is a point source associated with a lens adapted to generate a parallel beam directed toward said mirror.

8. The device claimed in claim 6 including an expander between said mirror and said support.

9. The device claimed in claim 3 including a third light source at the periphery of said support to illuminate a lens on said support at grazing incidence.

10. The device claimed in claim 1 wherein said analysis system includes a frosted translucent screen perpendicular to said optical axis between said support and an optical receiver.

11. The device claimed in claim 10 wherein said frosted translucent screen is adapted to be driven in rotation about an axis parallel to and spaced from said optical axis.

12. The device claimed in claim 10 wherein said optical receiver is a matrix sensor or a video camera.

13. A device for automatically detecting characteristics of an ophthalmic lens, comprising:
    a support shaped to receive a lens and,
    on respective opposite sides of said support, i) an illumination system including an optical system for producing a light beam directed toward a lens on said support and, ii) a system for analyzing the image transmitted by said lens on said support,
    wherein said optical system defines two alternate optical paths for said light beam and a mask is placed on one only of said paths at a location such that it occupies a predetermined position relative to an optical axis of said analysis system, and said mask is disposed on the upstream side of said support with respect to the direction of said light beam.

14. A device for automatically positioning a centering and drive peg on an ophthalmic lens, including a device for automatically detecting characteristics of an ophthalmic lens, comprising
    a support shaped to receive a lens and,
    on respective opposite sides of said support, i) an illumination system including an optical system for producing a light beam directed toward a lens on said support and, ii) a system for analyzing the image transmitted by said lens on said support,
    wherein said optical system defines two alternate optical paths for said light beam and a mask is placed on one only of said paths at a location such that it occupies a predetermined position relative to an optical axis of said analysis system.

15. The device claimed in claim 14 including a controlled mobile positioning mechanism including an arm for positioning said peg adapted to engage in a space left free in the vicinity of said support.

16. The device claimed in claim 15 wherein said arm for positioning said peg includes a controlled rotary shaft at the end of which a centering and drive peg can be mounted.

17. The device claimed in claim 16 wherein said positioning mechanism can move said positioning arm along three orthogonal axes.

18. The device claimed in claim 1, wherein the mask forms a Hartmann matrix.

19. The device claimed in claim 13, wherein the mask forms a Hartmann matrix.

20. The device claimed in claim 14, wherein the mask forms a Hartmann matrix.

* * * * *